United States Patent
Wolverton

(10) Patent No.: US 11,861,028 B2
(45) Date of Patent: Jan. 2, 2024

(54) DEVICES, SYSTEMS, AND METHODS FOR SECURELY STORING AND MANAGING SENSITIVE INFORMATION

(71) Applicant: ELSI, Inc., Edmonton (CA)

(72) Inventor: Jerry Elford Wolverton, Edmonton (CA)

(73) Assignee: ELSI INC, Edmonton (CA)

( * ) Notice: Subject to any disclaimer, the term of this patent is extended or adjusted under 35 U.S.C. 154(b) by 218 days.

(21) Appl. No.: 17/370,561

(22) Filed: Jul. 8, 2021

(65) Prior Publication Data

US 2023/0007901 A1   Jan. 12, 2023

(51) Int. Cl.
| | |
|---|---|
| *G06F 21/78* | (2013.01) |
| *G06F 21/70* | (2013.01) |
| *G06F 21/62* | (2013.01) |
| *G06F 21/60* | (2013.01) |
| *G06F 21/32* | (2013.01) |
| *G06F 21/79* | (2013.01) |

(52) U.S. Cl.
CPC .......... *G06F 21/6218* (2013.01); *G06F 21/32* (2013.01); *G06F 21/602* (2013.01); *G06F 21/78* (2013.01)

(58) Field of Classification Search
None
See application file for complete search history.

(56) References Cited

U.S. PATENT DOCUMENTS

2019/0007203 A1*   1/2019   Bolotin ................. G06F 21/602

FOREIGN PATENT DOCUMENTS

TW         1753286 B   *   1/2022

OTHER PUBLICATIONS

Management of Symmetric Cryptographic Keys in Cloud Based Environment. Fakhar. ICACT. (Year: 2013).*
An Efficient Quality-Aware Memory Controller for Multimedia Platform SoC. Lee. IEEE. (Year: 2005).*
Trusted-Cloud: A Cloud Security Model for Infrastructure as a Service (IaaS). Sethi. IJARCSSE. (Year: 2016).*
CaSE: Cache-Assisted Secure Execution on ARM Processors. Zhang. IEEE. (Year: 2016).*

* cited by examiner

*Primary Examiner* — Venkat Perungavoor

(57) ABSTRACT

Devices, systems, and methods for storing and managing sensitive information in a connected environment are provided. The system comprises a master controller and a sensitive information storage device ("SIS device"). The SIS device has an island that can be activated by user interaction with the SIS device. In general, the island is deactivated by default and when the island is deactivated, sensitive information that is stored on the SIS device cannot be accessed. Only when the island is activated by user interaction can the stored sensitive information be accessed.

17 Claims, 6 Drawing Sheets

DEVICES, SYSTEMS, AND METHODS FOR SECURELY STORING AND MANAGING SENSITIVE INFORMATION

CROSS-REFERENCE TO RELATED APPLICATION(S)

This application claims priority to U.S. Provisional Patent Application No. 62/590,441, entitled "Device, Systems, and Methods for Securely Storing and Managing Sensitive Information," filed on Nov. 24, 2017, the entirety of which is hereby incorporated by reference. This Application is also a US Continuation Patent Application from U.S. patent application Ser. No. 16/196,298, entitled "Device, Systems, and Methods for Securely Storing and Managing Sensitive Information," filed on Nov. 20, 2018, the entirety of which is hereby incorporated by reference.

FIELD

The present disclosure relates to sensitive information storage devices, systems, and methods for storing and managing sensitive information such as usernames and passwords in a connected environment. The sensitive information is selectively accessible upon explicit demonstration of user intention to access the information.

BACKGROUND

With the prevalence of the Internet and network connectivity in households and businesses, many people obtain and/or provide information through a variety of avenues such as websites, applications ("apps"), networks, servers, personal computers, etc. (collectively referred to as "online sources" hereinafter) and many online transactions, some of which may involve electronic payments, take place through such online sources. For security reasons, many online sources require a user to be identified and authenticated in order for the user to access information or conduct business by way of the user first logging in with a username and a password. When a user accesses a particular online source that requires user login for the first time, the user needs to sign up by providing an acceptable username and password. In other words, for every new signup, the user is expected to provide a fresh username and password (together referred to as "login credentials" hereinafter) and remember the login credentials for subsequent logins.

Typically, users tend to employ the same username and password that are easy to remember and recollect across most or all online sources. However, a negative consequence is the exposure of users' online accounts to a "break once, run everywhere" (BORE) attack since, once a given user's username and password are stolen, most or all of such user's online accounts are suddenly vulnerable. Conversely, it is inconvenient for a user to come up with a number of different usernames and passwords and later remember them correctly or use the correct login credentials for the correct online source.

SUMMARY

A system for storing and managing sensitive information is provided; and the system comprises: a master controller and a sensitive information storage device ("SIS device"). The SIS device has an "island" that can be activated by user interaction with the SIS device (also referred to herein as "user intent"). In general, the island is deactivated by default and when the island is deactivated, sensitive information that is stored on the SIS device cannot be accessed. Only when the island is activated by user interaction can the stored sensitive information be accessed.

Unlike existing systems, the present disclosure provides devices, systems, and methods that are configured to create a non-software-based barrier (i.e. the island) in a connected environment that is only penetrable upon explicit user interaction, thereby giving the user ultimate control over when the sensitive information stored on the SIS device can be accessed. Direct machine-to-machine communication is used to transmit the sensitive information between the SIS device and the master controller. In other words, the device, systems, and methods described herein do not use software as the gatekeeper to the sensitive information nor the Internet for retrieving the sensitive information. As a result, security risk is minimized In a sample embodiment, when the master controller sends a request to the island for retrieving sensitive information stored on the SIS device, the SIS device cannot process the request until user interaction occurs. Once explicit user intent is demonstrated, the SIS device processes the request and sends a response to the island. The master controller can then read the response and react accordingly. In this manner, the master controller does not have direct access to the sensitive information stored on the SIS device and only the information the user intends to retrieve is revealed to the master controller.

User intent may be demonstrated for example by turning on a switch on the SIS device to activate the island, thereby allowing the SIS device to communicate with the master controller. In the absence of user intent, the master controller cannot access the information stored on the SIS device. The sensitive information stored on the SIS device may be encrypted.

The master controller may be directly connected to an online source, such as a personal computer, that has, installed on it thereon, an application that can make requests to the master controller to retrieve specific information that, when received, can automate the use of the information, such as automatically logging into an account with the information.

The operation of the SIS device does not require any involvement by, or participation from, service providers. Therefore, the systems and methods of the present disclosure may be implemented without modifying existing networks or service provider infrastructure.

According to a broad aspect of the present disclosure, there is provided a device comprising: a communication unit operable to communicate with a master controller via a communication link; a memory; and an island activatable by user interaction, wherein activation or deactivation of the island controls the master controller's access to data stored in the memory via the communication link.

According to another broad aspect of the present disclosure, there is provided a system comprising: a master controller; an SIS device operable to communicate with the master controller via a communication link, the SIS device comprising: a memory; and an island activatable by user interaction, wherein activation or deactivation of the island controls the master controller's access to data stored in the memory via the communication link.

According to another broad aspect of the present disclosure, there is provided a method of storing and managing sensitive information, the method comprising: upon detecting user interaction from a user, activating an island in an SIS device, the SIS device configured to communicate with a master controller via a communication link; and controlling access, by the master controller via the communication link, to data stored on the SIS device, based on the activation or deactivation of the island.

BRIEF DESCRIPTION OF THE DRAWINGS

The subject matter of the present disclosure will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

DETAILED DESCRIPTION

In the present disclosure, all terms not defined herein have their common art-recognized meanings. To the extent that the following description is of a specific embodiment or a particular use of the subject matter of the present disclosure, it is intended to be illustrative only, and not limiting of the claimed subject matter. The following description is intended to cover all alternatives, modifications and equivalents that are included in the spirit and scope of the present disclosure, as defined in the appended claims.

The present disclosure provides a sensitive information storage device (also referred to herein as an "SIS device"), systems, and methods for securely storing and managing sensitive information such as login credentials) Social Insurance Numbers (SINs), Social Security Numbers (SSNs), healthcare numbers, bank account numbers, lock combinations, passport numbers, cryptocurrency, tokens, certificates, any digital data or file, etc. In some embodiments, the system can also act as a two factor authentication device as the SIS device can store tokens along with login credentials to verify that the user is a real person. The SIS device provides selective access to the sensitive information upon demonstration of the intention of the SIS device's user to retrieve the information.

A system for storing and managing sensitive information comprises: a master controller and a sensitive information storage device ("SIS device"). The SIS device has an island that can be activated by user interaction with the SIS device. In embodiments, the island is a physical component (or non-software-based component) of the SIS device. In general, the island is deactivated by default and when the island is deactivated, sensitive information that is stored on the SIS device cannot be accessed. Only when the island is activated by user interaction can the stored sensitive information be accessed. The user interaction may be in the form of a switch that the user can turn on to activate the island.

In one embodiment, when the master controller sends a request to the island for retrieving sensitive information stored on the SIS device, the SIS device cannot retrieve the request from the island and process same until user interaction occurs. Once user intent is demonstrated, the SIS device processes the request and sends a response to the island. The master controller can then read the response and react accordingly. In this manner, the master controller does not have direct access to the sensitive information stored on the SIS device and only the information the user intends to retrieve is revealed to the master controller.

In one embodiment, when the user demonstrates user intent, the master controller may have access to the sensitive information stored on the SIS device and the SIS device may rely on the passcode, read/write restrictions, and/or encryption of the SIS device chipset to control the master controller's access to the sensitive information.

Figure 1:
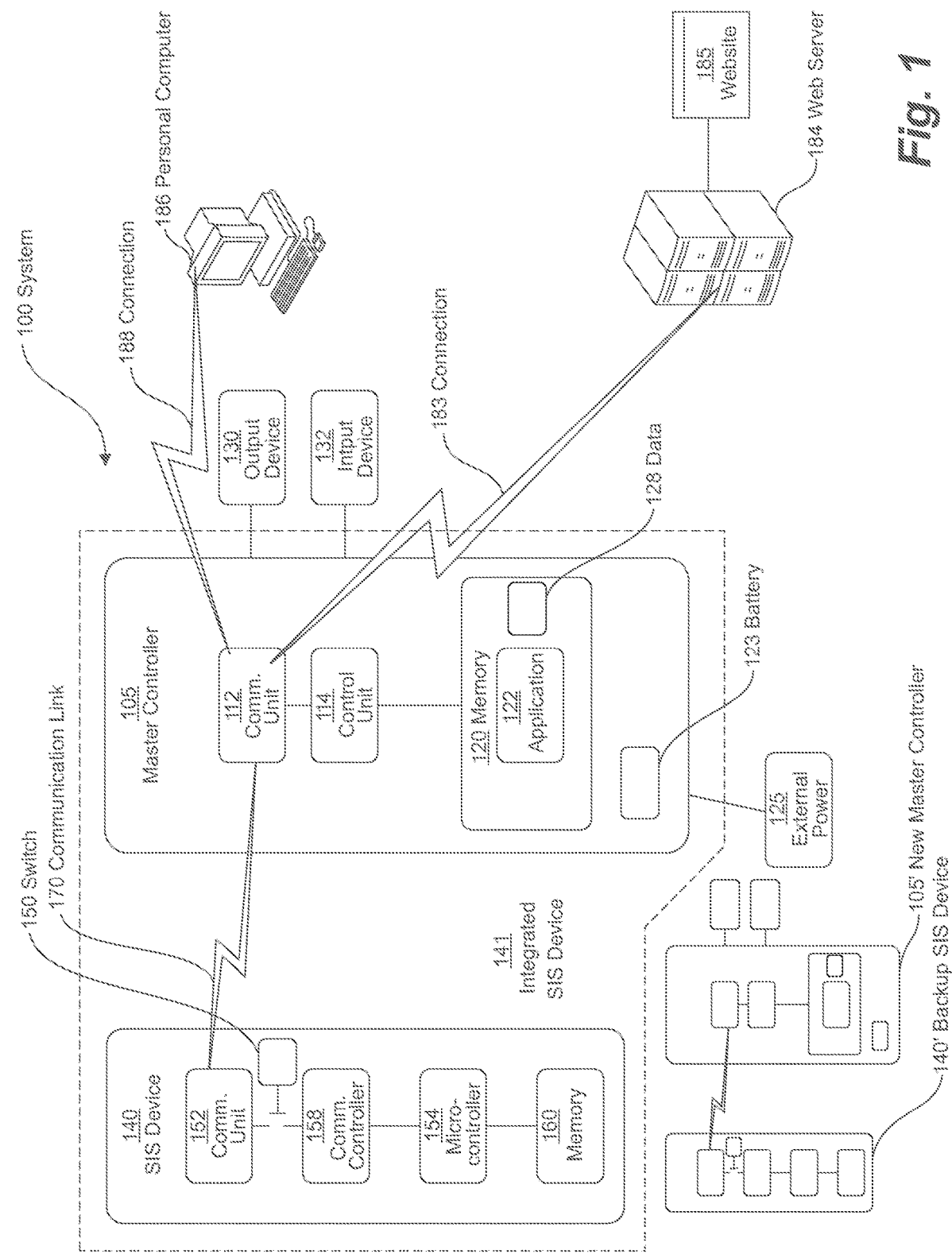
FIG. 1 is a block diagram illustrating a sample system comprising an SIS device and a master controller, according to an embodiment of the present disclosure.

Referring to FIG. 1, this block diagram illustrates a system 100 comprises an SIS device 140 and a master controller 105, according to an embodiment of the present disclosure. SIS device 140 is for storing and managing sensitive information and comprises a wireless communication unit 152 connected to a communication controller 158, which is the "island" in this embodiment, and a microcontroller 154. The microcontroller 154 is connected to a memory 160. SIS device 140 also has a "switch" 150 which has an "on" position and an "off" position. In the on position, the switch 150 connects the wireless communication unit 152 with the island 158, thereby activating the island 158. In the off position, the switch 150 disconnects the wireless communication unit 152 from the island 158, thereby deactivating the island 158.

Still referring to FIG. 1, in some embodiments, two or more of the microcontroller 154, the communication controller 158, the memory 160, and the wireless communication unit 152 may be integral parts of a chip, such as a secure element. Alternatively, one or more of the microcontroller 154, the communication controller 158, the memory 160, and the wireless communication unit 152 may be implemented in separate chips, as in a chipset.

Still referring to FIG. 1, the master controller 105 is a communication device that is configured to communicate with SIS device 140 upon a request to manage and/or access sensitive information. Master controller 105 generally comprises a wireless communication unit 112 and a control unit 114 in communication with a memory 120. The master controller 105 may also have an internal battery 123 which may be recharged by an external power source 125. Alternatively or additionally, the master controller 105 may be powered by the external power source 125. For example, master controller 105 may be a mobile device such as a laptop computer, notebook computer, tablet computer, netbook computer, mobile computer, feature phone, smartphone, palmtop computer, smartwatch, fitness tracker, virtual or augmented reality headset, virtual or augmented reality glasses, or other computing device such as a desktop computer, server, etc., or a combination thereof.

Still referring to FIG. 1, the memory 120 of master controller 105 may have software applications and data stored therein, such as application 122 and data 128 as illustrated in FIG. 1. In some embodiments, the control unit 114 and the wireless communication unit 112 may be integral parts of a chip. Alternatively, the control unit 114 and the wireless communication unit 112 may be implemented in separate chips, as in a chipset. In some embodiments, the wireless communication unit 112 and/or the control unit 114 may include hardware, firmware, software, or a combination thereof. In some embodiments, some of the hardware components of the communication unit 112 and/or the control unit 114 may include discrete electronic components on a printed circuit board.

Still referring to FIG. 1, the master controller 105 may also include an output device 130 and an input device 132. The output device 130 outputs information to a user visually, audibly, or both. The input device 132 receives input from the user. Although the output device 130 and the input device 132 are illustrated as being separate from each other in FIG. 1, in some embodiments, the output device 130 and the input device 132 may be integral parts of an input/output device. Although the output device 130 and the input device 132 are illustrated as being detachably coupled to the master controller 105 in FIG. 1, in some embodiments, the output device 130 and/or the input device 132 may be an integrated component of the master controller 105. Input device 132 may include for example a keyboard, mouse, pen, voice input device, touch input device, etc. Output device 130 may include for example a display, speakers, printer, etc.

Still referring to FIG. 1, the memory 120, 160 may be volatile (such as RAM), non-volatile (such as ROM, flash memory, etc.) or a combination thereof. In one embodiment, the memory component 160 of SIS device 140 comprises the combined non-volatile memory of two or more of the wireless communication unit 152, the communication controller 158, and the microcontroller 154. In another embodiment, the memory component 160 comprises one or more non-volatile memory storing chips and optionally the combined non-volatile memory of two or more of the wireless communication unit 152, the communication controller 158, and the microcontroller 154. The memory 160 may be part of a secure element.

Still referring to FIG. 1, both the SIS device 140 and master controller 105 are equipped with necessary hardware and/or software to enable them to establish a communication link 170 therebetween. In one embodiment, master controller 105 has a program or application 122 installed thereon for communicating with and controlling SIS device 140. In embodiments, the communication link 170 is not an Internet-based communication protocol. The communication link 170 may be based on a wireless communication protocol, including for example Wi-Fi®, Bluetooth®, radio-frequency identification ("RFID"), near-field communication ("NFC"), etc., or a combination thereof. The wireless communication unit 112 can establish wireless communication with the wireless communication unit 152 of SIS device 140, to receive information from and transmit information to the SIS device 140 via the communication link 170. Alternatively or additionally, the communication link 170 may be based on a wired connection that allows communication between communication units 152 and 112. In some embodiments, the communication link 170 provides power to the SIS device 140. In further embodiments, the SIS device 140 may use one or more communication protocols and/or wired connections for its power supply and/or communication function. For example, the SIS device 140 may use NFC for power while using Bluetooth or Wi-Fi for communication. In other embodiments, the SIS device 140 uses NFC for both power and communication. In yet another embodiment, the SIS device 140 uses Wi-Fi for power while using Bluetooth for communication. Of course, other variations are possible.

Still referring to FIG. 1, as an example for illustrative purposes, both SIS device 140 and master controller 105 are NFC-enabled devices and communication link 170 is based on NFC. NFC is a standards-based connectivity technology that establishes wireless connection between two devices in close proximity of each other, typically in the order of a few centimeters. NFC allows users to transfer information by touching, or tapping, one device with another device. As with proximity card technology, NFC uses magnetic induction between two loop antennas located within two NFC-enabled devices that are within close proximity of each other, effectively forming an air-core transformer. The act of bringing one NFC-enabled device to close proximity of another NFC-enabled device with or without the two devices physically contacting each other, is referred to as an "NFC tap" or "tapping" operation hereinafter. With an NFC tap operation, a user can conveniently perform a variety of tasks, including mobile payment, secure login, wireless pairing, triggering peer-to-peer data exchange, file transfer, file sharing, mobile gaming, user identification, and so on. Many smartphones currently on the market already contain embedded NFC chips that can send encrypted data a short distance to a reader located next to a retail cash register.

Still referring to FIG. 1, the NFC is an open platform technology standardized in ECMA-340 and ISO/IEC 18092. With these standards, ECMA is European Computer Manufacturers Association, ISO is International Organization for Standardization and IEC is for the International Electrotechnical Commission. Generally, these standards specify the modulation schemes, coding, transfer speeds and frame format of the RF interface of NFC devices, as well as initialization schemes and conditions required for data collision-control during initialization for both passive and active NFC modes. Furthermore, these standards also define the transport protocol, including protocol activation and data-exchange methods.

Still referring to FIG. 1, when SIS device 140 is in close proximity of master controller 105 and the island is activated, information exchange between SIS device 140 and master controller 105 occurs through the NFC-based communication link 170. This is the NFC tap. In some embodiments, the NFC tap is sufficient to demonstrate user intent.

Still referring to FIG. 1, the switch 150 may not necessarily be a physical switch. For example, for an SIS device 140 that is NFC-enabled, the position of the switch 150 may simply be determined by whether the device 140 is within NFC range of the master controller 105. More specifically, in this sample embodiment, the switch 150 is off when the device 140 is out of NFC range of the master controller 105, and the switch 150 is on when the device 140 is within NFC range of the master controller 105.

Still referring to FIG. 1, in a sample embodiment, the SIS device 140 comprises an NFC memory tag or microprocessor, such as a memory smart card. In a further embodiment, the switch 150 is on the communication unit 152 and is in the off position by default, wherein the switch 150 is open such that communication unit 152 is disconnected from the NFC memory tag or microprocessor. When the switch is off, the SIS device is not in communication mode and remains so unless the user demonstrates intent by turning the switch 150 on. When the switch 150 is in the on position, the switch 150 is closed to connect communication unit 152 with the NFC memory tag or microprocessor, thereby allowing communication from the master controller 105 to the SIS device 140. The master controller 105 can then read and write directly to the memory 160 of the SIS device 140.

Still referring to FIG. 1, in one embodiment, the wireless communication unit 152 is an NFC antenna and the island 158 is an NFC controller with an NFC energy harvesting chip. The NFC energy harvesting chip allows SIS device 140 to operate without the need for an internal power source. The switch 150, which may be a physical switch, allows the SIS device's user to control when the NFC energy harvesting chip can harvest power from another NFC device, such as the master controller 105, to help prevent a malicious user within range from communicating with the SIS device 140 without the authorized user's knowledge. By turning on switch 150, thereby connecting the NFC antenna with the NFC controller, the user enables the NFC energy harvesting chip to harvest energy from the NFC signal of the master controller when the SIS device is within NFC range of the master controller 105 to power the components of SIS device 140. Once powered, the SIS device 140 can communicate with the master controller, using any of the above-mentioned communication protocols and/or wired connection or any combination thereof, and process any requests from the master controller. In other words, the SIS device 140 has no power and cannot operate or be detected unless it is within NFC range of the master controller 105 (or another NFC emitting device) and the switch 150 is turned on.

Still referring to FIG. 1, the "island" of the SIS device does not necessarily have to be the communication controller 158. In other embodiments, the island may be the communication unit 152, the microcontroller 154, or the memory 160. The position of the switch 150 may determine the location of the island in the SIS device 140. In some embodiments, which are not shown, the switch 150 may be positioned elsewhere in the SIS device 140. In one example, the switch is connected to the communication unit 152 to activate and deactivate same, such that signals cannot be received or transmitted unless the switch is on. In another example, the switch is connected to the NFC energy harvesting chip to activate and deactivate same, such that the chip cannot harvest energy unless the switch is on. In yet another example, the switch 150 may be used to connect and disconnect the communication controller 158 from the microcontroller 154. In another example, the switch 150 may be used to connect and disconnect the microcontroller 154 from the memory 160. In another example, where the SIS device comprises an NFC memory tag or microprocessor, the SIS device itself may be considered the "island" and the switch 150 may be a physical switch on the communication unit 152 or may be turned on when the SIS device is within NFC range of the master controller 105. Other switch and/or island configurations may be possible.

Still referring to FIG. 1, the SIS device 140 may optionally include a visual, audible, and/or sensory range indicator, such as an LED light, sound, or vibration, which turns on when the SIS device 140 is within range of another NFC device, to let the user know for example where to place the SIS device 140 relative to the NFC-enabled master controller 105. The range indicator may be part of a range indication NFC antenna circuit separate from the wireless communication unit 152 and island 158, which are normally disconnected while the switch 150 is in its default off position. The range indication NFC antenna circuit comprises its own NFC antenna, and, optionally, an NFC controller, permanently connected to the indicator so that when the range indication NFC antenna circuit is within range of another NFC enabled device, wherein the range indication NFC antenna circuit provides power to the indicator to activate the same (e.g., light it up), regardless of whether the switch 150 is turned on. In other words, even when the switch 150 is off and the main SIS device components have no power, the indicator can still be activated, because it is powered by the separate range indication NFC antenna circuit.

Still referring to FIG. 1, in an alternative or additional embodiment, both the SIS device 140 and master controller 105 are configured to communicate via connected communication protocols such as Bluetooth, Wi-Fi, etc. "Bluetooth" used herein refers to Bluetooth, Bluetooth LE, and all variations and future versions thereof. When using connected communication protocols, there is more potential for malicious attempts to access the SIS device 140 without the user's knowledge. To mitigate this problem, the island 158 acts as an intermediary between the wireless communication unit 152 and the memory 160 where the sensitive information is stored. When switch 150 is off, the island is in the deactivated or "communication" position, wherein the island is in communication with the wireless communication unit 152 but is disconnected from the memory 160. When the switch 150 is turned on, the island 158 is in the activated or "memory" position, wherein the island is disconnected from the wireless communication unit 152 and is in communication with the memory 160. Suitable hardware, firmware, and/or software are used for the island 158.

Still referring to FIG. 1, by default, the switch 150 is in the off position and the island 158 is deactivated or in the communication position. When the wireless communication unit 152 receives a request from the master controller 105 for sensitive information, the request is sent to the island 158 and is stored there until the user shows intent by turning on the switch 150. When the switch 150 is on, the island is activated or placed in the memory position, and the island disconnects from the wireless communication unit 152, connects to the memory 160, and then processes the request and retrieves the requested sensitive information from the memory 160. The switch 150 is turned off automatically thereafter so that communication between the island 158 and the wireless communication unit 152 can resume. Once island 158 reconnects with wireless communication unit 152, the sensitive information is sent out by the wireless communication unit 152 via communication link 170 to the master controller 105.

Still referring to FIG. 1, in a sample embodiment, the island 158 may comprise an island memory chip. When the switch is in its default off position, the island memory chip is connected to the wireless communication unit 152 but not to the microcontroller 154, thus allowing the communication unit 152 to write data to the island memory chip. The microcontroller 154, therefore, acts as the gate keeper to the memory 160. When the switch is turned on, the island memory chip is disconnected from the wireless communication unit 152 and is connected to the microcontroller 154. Therefore, when the switch 150 is on, the microcontroller 154 can read and process the data on the island memory chip and can also write to the island memory chip. When the switch is turned off again, the connection between communication unit 152 and the island memory chip is re-established and the wireless communication unit 152 can then read the data on the island memory chip and transmit same to the master controller 105.

Still referring to FIG. 1, in another sample embodiment, the island may be part of the microcontroller 154 such that when the switch is off, the microcontroller 154 is connected to the wireless communication unit 152 but disconnected from the memory 160, and when the switch is on, the microcontroller 154 is disconnected from the wireless communication unit 152 and connected to the memory 160. When the switch is off, the wireless communication unit 152 can communicate directly with the microcontroller 154. When the switch is on, the microcontroller 154 can retrieve information from memory 160.

Still referring to FIG. 1, in some embodiments, especially where the communication link 170 is based on connected communication protocols, the communication may be encrypted for an added layer of security.

Still referring to FIG. 1, the SIS device 140 is preferably small enough to be easily portable or embedded in a portable object. For example, SIS device 140 may be integrated into or in the form of a credit card, key fob, coin, ring, sticker, ID badge, watch strap, implant, phone case, bracelet, etc. The SIS device may itself be a computing device with a processor, input device, output device, etc. The size and form factors are only limited by the size of components used for the SIS device.

Still referring to FIG. 1, in some embodiments, two or more different devices may operate together to act as the master controller. For example, a Bluetooth and NFC-enabled smartwatch can act as a conduit for a smartphone to communicate with the SIS device. The smartphone can send a request to the smartwatch to retrieve login credentials for an account, and the smartwatch can then be used to retrieve the requested login credentials from the SIS device with a simple NFC tap. The smartwatch can thereafter transmit the login credentials back to the smartphone to be used by the smartphone itself or to be forwarded to an online source that requested the login credentials. In a further embodiment, the SIS device may be built into the watch band of the smartwatch.

Still referring to FIG. 1, to protect sensitive information, the sensitive information is preferably stored in SIS device 140 only and none of the sensitive information is stored in master controller 105. The master controller's main function is to provide a gateway for the user to add, retrieve, update, and delete information on SIS device 140. The master controller 105 helps the user manage and track the information stored on SIS device 140, without storing the sensitive information itself.

Still referring to FIG. 1, in some embodiments, memory 120 of master controller 105 stores a list of online sources that the user has previously created an account. The master controller 105 may also store the account(s) that is associated with each online source. The master controller may assign an alias to an account if more than one account is associated with the same online source, in order to help the user distinguish between different accounts. Memory 160 of SIS device 140 stores a list of accounts and the login credentials associated therewith.

Still referring to FIG. 1, in some embodiments, memory 160 stores data on the identity of the online sources. In other embodiments, for added security, memory 160 does not store the identity of the online sources, such that if the SIS device 140 is hacked, the hacker cannot link the stored login credentials to their corresponding online sources. In some embodiments, the identity of the online sources is stored in another device that is separate from the SIS device 140.

Still referring to FIG. 1, in some embodiments, for each account's login credentials, master controller 105 generates an Account ID and stores the Account ID with the identity of the corresponding online source account. The master controller also sends the Account ID to the SIS device 140 so that the SIS device can store the Account ID in association with the corresponding login credentials. Accordingly, when the master controller needs to retrieve the login credentials for a particular account, the master controller sends a request to SIS device 140 with the corresponding Account ID and the SIS device 140 uses the Account ID to look up the login credentials.

Still referring to FIG. 1, in some embodiments, instead of using an Account ID to look up the login credentials, the master controller may use the memory location of the login credentials to store and retrieve same from the SIS device. This may help simplify the programming of the SIS device, as the master controller handles more of the actual management of the sensitive information by tracking the memory location of each account and/or login credentials associated therewith on the SIS device. In this manner, the master controller can simply request the SIS device to retrieve a specific memory location and, in response, the SIS grabs the specific memory location rather than performing a search for a particular Account ID.

Still referring to FIG. 1, in some embodiments, the sensitive information on the SIS device 140 is encrypted, which can only be decrypted by the master controller.

Still referring to FIG. 1, in some embodiments, the master controller may, upon user request, randomly generate passwords for the user and the randomly generated passwords may be based on user defined criteria such as length, permitted characters, etc.

Still referring to FIG. 1, the SIS device 140 can verify whether the master controller 105 is an authorized master controller that is allowed to access the sensitive information stored on SIS device 140. In some embodiments, an identification code is associated with each master controller and the identification code may be based on a plain language description, a name given by its user, a serial number, a phone number, a Media Access Control (MAC) number, etc., or a combination thereof. The SIS device stores the identification code of the master controller that is authorized by the user to establish communication with the SIS device. Any request and/or information sent to the SIS device from the master controller 105 contains the identification code and, upon receipt of the request and/or information, the SIS device 140 compares the identification code with the stored identification code of the authorized master controller. When there is a match between the identification code of the master controller 105 and the identification code of the authorized master controller, the SIS device 140 verifies the master controller as an authorized master controller, and further communication and operations may ensue. In an event that the master controller is not verified as an authorized master controller, the SIS device 140 will not allow the unauthorized master controller to access the sensitive information. In some embodiments, SIS device 140 may store a list of identification codes of multiple authorized master controllers so that more than one master controller may access the same SIS device.

Still referring to FIG. 1, in alternative or additional embodiments, the communication unit 152 is passcode protected and only a master controller with the correct passcode can communicate with the SIS device 140. In some embodiments, the master controller has an encryption key and the SIS device is configured to only communicate with master controllers that have a specific encryption key. The SIS device 140 can use the passcode or the encryption key to determine whether a master controller is an authorized master controller. In other words, the SIS device can authenticate a master controller using the encryption key, identification code, and/or passcode.

Still referring to FIG. 1, in some embodiments, the master controller may store an identification number unique to the SIS device, such as a UID, as a way to control and/or track which SIS device(s) can communicate with the master controller. For example, if the UID of a particular SIS device is not stored in the master controller, the master controller does not communicate with that particular SIS device even if the SIS device is within NFC range and/or the switch turned on. Therefore, the master controller may be configured to only communicate with SIS devices with UIDs that are recognizable by the master controller. This allows the master controller to authenticate an SIS device as an authorized SIS device and to only communicate with authorized SIS devices.

Still referring to FIG. 1, the master controller 105 may receive information from and provide information to one or more of online sources, for example a web server 184 and a personal computer 186 via connections 183, 188, respectively. In a sample embodiment, the web server 184 hosts a website 185. Connections 183, 188 may be network connections via a network, which may be one or more wired and wireless networks and the Internet, or a combination thereof. In other embodiments, connections 183, 188 are direct connections (i.e. machine-to-machine connections) using a wireless communication protocol (e.g., Bluetooth) or a wired connection. A direct connection allows communication where no mobile cellular service or Internet access is available, such as remote work environments. A direct connection also keeps the transmission of sensitive information strictly between master controller 105 and the online source, thereby minimizing the risk of malicious interception or attack by a third party.

Still referring to FIG. 1, in some embodiments, master controller 105 may be configured to selectively store less sensitive information in its memory 120 when convenience is preferred over security. A benefit of this embodiment is that the user is not required to access the SIS device 140 which may be stored away for transportation or security. This may be the preferred option where the effort to access the SIS device 140 outweighs the security risk of that particular online source, such as an account relating to an online blog, or where the user has limited direct access to the SIS device. In these embodiments, the user would still authenticate herself with the master controller 105 to retrieve the less sensitive information, for example with a password, passcode, fingerprint, biometric scan, etc., or a combination thereof, which may or may not be already stored in the master controller 105. In further embodiments, the user may choose to rid the need to authenticate to retrieve the less sensitive information from the master controller 105. In this case, if a request is made to the master controller 105 from an online source 184, 186 and the master controller 105 is within range to communicate with the online source through connections 183, 188, then the information can be automatically retrieved from the master controller without any user interaction. The user may choose this option for convenience, with the understanding that the only barrier to the information stored in the master controller 105 is being out of communication range of the online source 184, 186.

Still referring to FIG. 1, in some embodiments, the master controller 105 acts as an input peripheral for an online source, such as for example a USB HID keyboard. In other words, the master controller 105 can automatically sign into the online source by simulating the keystrokes required for the username and password.

Still referring to FIG. 1, in one embodiment, the master controller 105 may store one or more recovery contacts, such as phone numbers, in the SIS device 140, so that in the event that the master controller 105 is lost, stolen, or damaged, a new master controller having one of the recovery contacts can connect to the SIS device 140. New master controller 105' may have all the same components, features, and functions as master controller 105 as described above. In a sample embodiment, when a new master controller 105' tries to communicate with SIS device 140, the SIS device 140 acknowledges that the new master controller is not the old one. The SIS device then sends, via the new master controller, a message containing a temporary passcode to the recovery phone number. If the new master controller 105' is associated with the recovery phone number (e.g. the new master controller has a sim card with the recovery phone number), then the new master controller receives the message with the passcode. The SIS device 140 then requests that the passcode be entered on the new master controller via the input device 132. If the passcode entered on the new master controller 105' matches the passcode sent by the SIS device 140, the SIS device 140 allows the new master controller to access the sensitive information stored therein. In another embodiment, the control unit 114 of the new master controller 105' may directly and automatically enter the received passcode without using the input device 132. In some embodiments, when a new master controller with a new phone number is trying to access the SIS device 140, the temporary passcode may be entered into the new master controller to render it an authorized master controller for the SIS device. While the above is described with respect to phone numbers, it can be appreciated that the recover contacts may be include other forms of communication, such as email addresses, social media accounts, etc.

Still referring to FIG. 1, in one embodiment, a backup SIS device 140' is required for connecting the main SIS device 140 with the new master controller 105'. The backup SIS device 140' may have all the same components, features, and functions as the SIS device 140 as described above. The backup SIS device 140' is intended to be kept in a secured place separate from the main SIS device 140, while the main SIS device 140 is intended to be carried around by the user. For example, the backup SIS device 140' may be a docking and/or charging station for the master controller 105. The backup SIS device 140' has in its memory the encryption key, identification code, and/or passcode of the master controller 105 so that when the new master controller 105' communicates with the backup SIS device 140', the new master controller can obtain the necessary encryption key, identification code, and/or passcode to communicate with and access the main SIS device 140. In some embodiments, the backup SIS device 140' may be associated with and support more than one main SIS device 140.

Still referring to FIG. 1, the new master controller 105' first connects with the backup SIS device 140', retrieves the sensitive information stored on the backup SIS device 140', and then passes the sensitive information to the main SIS device 140 to reset the SIS device 140, thereby overwriting the previous sensitive information stored on the SIS device 140. The new master controller 105' stores the identity of the online sources and Account IDs in its memory 120 while deleting the associated login credentials and other sensitive information from its system. In this embodiment, only the backup SIS device 140' can give the new master controller 105' access to the sensitive information and only the backup SIS device 140' can send a passcode to the recovery phone number. Requiring access to the backup SIS device 140' may prevent a malicious master controller from trying to connect to the main SIS device 140 under false pretenses, as the main SIS device 140 is more likely to be lost or stolen on its own.

Still referring to FIG. 1, while being reset, the SIS device 140 may compare the sensitive information stored thereon with those stored on the backup SIS device 140' to determine the number of accounts that were in the main SIS device 140 but are not in the backup SIS device 140'. The information stored on the backup SIS device 140' might not be up-to-date, as some accounts may have been added, modified, or deleted since the backup SIS device 140' was last updated. While the comparison does not provide the user the details of any discrepancy, the user is at least made aware of the number of accounts that is missing in the backup SIS device 140'.

Still referring to FIG. 1, the backup SIS device 140' may have the same or different firmware programs than the main SIS device 140. In some embodiments, the backup SIS device 140' is configured to have different program structure than the main SIS device 140 to allow the backup SIS device to more efficiently store and update the sensitive information. For example, the backup SIS device 140' may be defragmented with no memory gaps and may store information, such as serial numbers, about the SIS device 140 being backed up. This may help avoid overwriting or updating backup SIS device 140' with the wrong main SIS device. In another example, the SIS device 140 and the backup SIS device 140' may have the same firmware programs but with different parts being implemented.

Still referring to FIG. 1, in some embodiments, the master controller 105 can convert the backup SIS device 140' to function as the main SIS device 140. For example, the master controller 105 can reformat the information stored on the backup SIS device 140' into a structure that can be searched and change the settings on the backup SIS device 140' to authenticate and handle requests from the master controller. In another example, the master controller can retrieve all the stored information from the backup SIS device 140' and convert the information into a structure that can be searched, and send the information back to the backup SIS device 140', thereby converting the backup SIS device 140' into a main SIS device 140. Of course, other ways of converting the backup SIS device 140' into a main SIS device are possible.

Still referring to FIG. 1, in one embodiment, the backup SIS device 140' may be set up and/or updated using the master controller. For example, the master controller 105 is configured to be able to read and temporarily store the data stored on the main SIS device 140 and transfer same to the backup SIS device 140'. Once the transfer is complete, the master controller 105 deletes the temporarily stored data from its memory 120 for added security. The master controller may keep track of any account that has been modified since the backup SIS device 140' was last updated and notify the user accordingly.

Still referring to FIG. 1, when the main SIS device 140 is lost, damaged, or stolen, the master controller may use the backup SIS device 140' to help the user retrieve her sensitive information. There may be discrepancies between the information stored on the main SIS device 140 and the backup SIS device 140' since the information stored on the backup SIS device 140' might not be up-to-date, as some accounts may have been added, modified, or deleted since the backup SIS device 140' was last updated. The master controller can compare its account information with those of the backup SIS device 140' to identify any new, modified, or deleted accounts. If an account was added or updated, then the user will have to resolve the account with the corresponding online source, since the master controller only knows which accounts are new or modified but does not have the corresponding login credentials.

Still referring to FIG. 1, in some embodiments, the master controller can export all data stored thereon in a single export file. The master controller may provide the user the option to include the sensitive information stored on the SIS device in the export file. In embodiments, the user is prompted to connect the SIS device with the master controller (e.g., by turning on the switch 150) to allow the master controller to retrieve the sensitive information. The export file may be a plain text file and may or may not be encrypted. In further embodiments, the master controller may provide the user the option to send the export file to an online source of the user's choice, such as a cloud storage service, a server, a personal computer, etc., or to another SIS device, another master controller, or a portable media storage device. The export file may be used to restore data on a new master controller or new SIS device, and to provide the user with a complete copy of the sensitive information, which may be converted to a hardcopy by printing.

Still referring to FIG. 1, in one embodiment, online sources 186, 184 have a login request program stored thereon to allow them to send a request to the master controller 105 for sensitive information, such as login credentials for signing into an account. The login request program may be for example a browser extension, an operating system program, etc. When the master controller 105 receives such a request, a notification is displayed or otherwise shown on the master controller. The notification may include an identification of the online source that is requesting sensitive information and the type of information that is requested, etc. The user then has the option to activate the island 158 to allow the master controller 105 to access the information stored on the SIS device 140. In one embodiment, the user shows intent by turning switch 150 on to activated activate the island 158. If the SIS device 140 and master controller 105 are relying on NFC to connect, the switch is turned on by bringing the SIS device within NFC range of master controller 105. If the SIS device 140 and master controller 105 are connecting by other communication protocols, then SIS device 140 may not necessarily have to be in close proximity to the master controller. While the island is activated, the sensitive information stored on the SIS device 140 can be accessed and the master controller 105 can then retrieve the sensitive information that is associated with the specific account of the online source from which the request was sent and send the requested sensitive information to the online source to log into the account automatically. In one embodiment, the master controller 105 may convert the requested sensitive information into the keystrokes required for logging in, such as the username and password, to allow automatic login. In another embodiment, the login request program stored on the online sources 184, 186 may convert the retrieved sensitive information into the keystrokes required for logging in to allow automatic login.

Still referring to FIG. 1, a request for sensitive information may be generated when the user is trying to log in to a locked personal computer having the login request program installed thereon. For example, a program may be installed on the personal computer that would generate a request whenever the user login screen is displayed. In another example, the request may be generated when the user clicks on the login screen or the login input box. In yet another example, a computer may include a passive NFC sticker that contains the identity of the computer and when the master controller scans the sticker, the master controller receives a request to log into that computer.

Still referring to FIG. 1, a request for sensitive information may also be generated when the user is trying to access a website 185 via an online communication device having the login request program installed thereon. The communication device may be the master controller itself or another device such as a smartphone, tablet, person computer, etc. For example, the user may surf the Internet through the browser application 122 and using the output device 130 and the input device 132 of the master controller 105. The website 185 may require the user to log in to a specific user account. In some embodiments, the request may be automatically generated by a program that can recognize online service access points, such as a login page displayed by its website address. In other embodiments, the request is generated by the user. In some embodiments, a browser web extension may monitor which websites are visited so that it can send requests based on the websites. In other embodiments, an operating system program may monitor which programs are active on the computer and may generate requests based on this knowledge.

Still referring to FIG. 1, once the master controller 105 receives the request for sensitive information, the master controller checks if the online source from which the request was generated is a recognizable one, i.e., the online source is one for which the SIS device 140 contains corresponding sensitive information. If the master controller 105 recognizes the online source and user intent has been demonstrated, the master controller automatically retrieves the relevant sensitive information from the SIS device 140 and sends same to the online source. After receiving the login credentials, the online source may automatically log in by simulating the keystrokes required for the login credentials.

Still referring to FIG. 1, if the master controller 105 recognizes the online source but there is more than one account on the SIS device 140 that corresponds to the online source, the master controller 105 will ask the user to select which account to retrieve the sensitive information from, via input device 132 and output device 130. Once the user makes the selection and shows user intent, the master controller 105 retrieves the sensitive information associated with the selected account from the SIS device 140 and sends same to the online source.

Still referring to FIG. 1, if the master controller 105 does not recognize the online source, the master controller will ask the user to choose the online source on the SIS device 140 from which to retrieve the sensitive information. This may be done using the input and output devices 132, 130 of the master controller. If there is more than one account associated with the chosen online source, the master controller will further ask the user to choose the account from which to retrieve the sensitive information. Once the online source and/or account is selected and user intention is demonstrated, the master controller retrieves the sensitive information from the SIS device 140 and sends same to the online source. After retrieving the sensitive information, the master controller may ask the user whether to associate the online source from which the request was generated with the selected online source stored on SIS device 140 going forward.

Still referring to FIG. 1, in one embodiment, the SIS device 140 may be integrated with the master controller 105 to form a single integrated SIS device 141. For example, the SIS device 140 may be connected to the master controller 105 by a wired connection 170 in one body. Optionally, a secondary computing device, such as a computer or smartphone, may be configured to manage the information on the integrated SIS device 141 and/or provide full communication, input, and/or output functions for the integrated SIS device 141 if necessary. For example, an external input and/or output device may be the secondary computing device. In this embodiment, provided that user intent has been demonstrated (i.e. the island has been activated), the integrated SIS device 141 can directly look up the sensitive information stored internally and can automatically send the sensitive information to any online source upon request via a communication link, to allow automatic log in where applicable. In other words, just like the SIS device 140, the integrated SIS device 141 does not allow access to the sensitive information stored therein in the absence of user intent. The integrated SIS device 141 may be paired (for example, via Bluetooth) with various online sources, to allow the integrated SIS device 141 to receive sensitive information requests from same. The user can show intent by turning on switch 150 to allow the sensitive information to be accessed by the integrated SIS device 141 through its island.

Still referring to FIG. 1, in some embodiments, the SIS device 140 or the integrated SIS device 141 may use biometric security to show user intent. For example, biometric input from the user may be used to turn on switch 150. In a further example, the SIS device 140 or the integrated SIS device 141 includes a fingerprint scanner and requires a fingerprint match to activate the island 158, thereby allowing access to the sensitive information. In other embodiments, the biometric security information can be inputted through the master controller, for example, via a fingerprint scanner on the master controller.

Still referring to FIG. 1, in a sample embodiment, the integrated SIS device 141 is or is part of a smartphone having a fingerprint scanner and the smartphone itself is requesting sensitive information from integrated SIS device 141. The user may show intent to access the sensitive information by scanning his fingerprint on the smartphone to prompt the integrated SIS device 141 to accept the request and send the requested information to the smartphone. In another example, the online source is a smartphone with NFC capability and the user may show intent by turning on switch 150 and/or tapping the smartphone to the NFC-enabled integrated SIS device 141 to power up and prompt the integrated SIS device 141 to receive the sensitive information request from the smartphone and to send the requested sensitive information.

Still referring to FIG. 1, in some embodiments, the master controller 105 can share sensitive information with another online communication device, such as another master controller, so that an account and its corresponding account information may be shared among multiple SIS devices. The master controller that shares sensitive information is referred to as the "sharing controller" and the device that receives the sensitive information from the sharing controller is referred to as the "receiving controller" hereinafter. The receiving controller may have its own SIS device that is separate from the sharing controller's SIS device. The sharing controller can set restrictions in terms of what the receiving controller can do with the received sensitive information. This may be achieved by, for example, having flag sets for the shared information, so that the receiving controller can only use the information as the flags would permit. The receiving controller's use of the sensitive information includes, for example, logging into an online source with the sensitive information.

Still referring to FIG. 1, in one embodiment, the sharing controller may allow the receiving controller to use the received sensitive information only once. This may be applicable for automatic sign in, such as to a Wi-Fi network. The sharing controller sends the login credentials to the receiving controller and the receiving controller immediately applies the credentials without displaying or storing same. In this embodiment, the receiving controller needs to request the sensitive information from the sharing controller for every use.

Still referring to FIG. 1, the sharing controller may allow the receiving controller's SIS device to store the received sensitive information but the receiving controller's use of the sensitive information is monitored by the sharing controller. For example, a notification is sent to the sharing controller every time the receiving controller uses the sensitive information. If the receiving controller cannot notify the sharing controller, then the receiving controller cannot retrieve the sensitive information from the receiving controller's SIS device. In some embodiments, once the notification is sent to the sharing controller, the receiving controller can only retrieve the sensitive information from its SIS device after receiving a confirmation from the sharing controller. This prevents the receiving controller from taking control over the sensitive information and/or logging into an online source without the sharing controller's knowledge and/or permission.

Still referring to FIG. 1, in other embodiments, the receiving controller can use the shared sensitive information stored on its SIS device without restriction. While a notification may optionally be sent to the sharing controller, the receiving controller does not require the sharing controller's confirmation to use the shared sensitive information.

Still referring to FIG. 1, in some embodiments, if any changes are made to the shared sensitive information on the sharing controller's SIS device, the sharing controller can notify the receiving controller to update the information accordingly. Likewise, if the sensitive information is deleted on the sharing controller's SIS device, the sharing controller can notify the receiving controller to delete the information. In embodiments where the receiving controller has unrestricted use of the sensitive information, the receiving controller may modify and/or delete the sensitive information on its SIS device and then notify the sharing controller so that the sharing controller can update its SIS device accordingly.

Still referring to FIG. 1, the receiving controller may have its own backup SIS device that is separate from the sharing controller's backup SIS device. In some embodiments, the sharing controller controls whether the receiving controller can back up the shared sensitive information on the receiving controller's backup SIS device.

Still referring to FIG. 1, in an illustrative embodiment, a household may have multiple master controllers each paired its own SIS device. The users in the household may share one account for a particular online source, for example, a TV/movie streaming website or app, such as Netflix'. In this embodiment, if one user updates the account information of the shared account, that user's master controller will send a notification along with the updated information to the other master controllers whose paired SIS devices also have the shared account's information stored thereon, so that the other master controllers can update the shared account information on their SIS devices accordingly.

Figure 2:
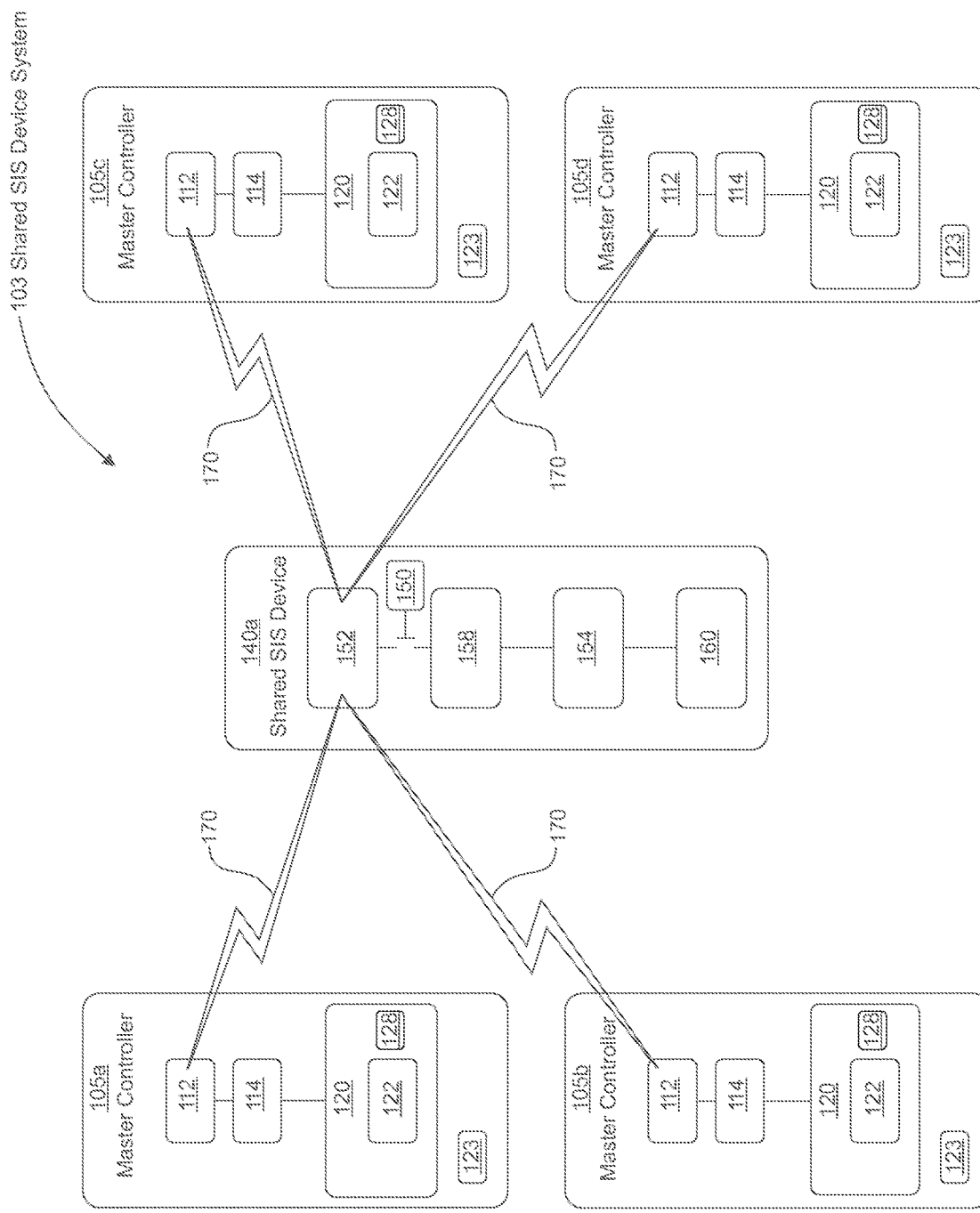
FIG. 2 is a block diagram illustrating a sample system comprising a shared SIS device paired with multiple master controllers, according to another embodiment of the present disclosure.

Referring to FIG. 2, in a sample system 103, multiple master controllers 105*a*, 105*b*, 105*c*, and 105*d* can access the same SIS device 140*a*. For example, a family home may have multiple users that share a single SIS device 140*a* (the "shared SIS device" hereinafter). Initially, only one master controller 105*a* is recognized as an authorized master controller by the shared SIS device 140*a*; however, master controller 105*a* can grant other master controllers 105*b*, 105*c*, 105*d* permission to access to the shared SIS device 140*a*. Once permission is granted, the identification codes of the other master controllers 105*b*, 105*c*, 105*d* are stored on shared SIS device 140*a* and/or the passcode of the communication unit 152 of device 140*a* are provided to the other master controllers 105*b*, 105*c*, 105*d* to give the other master controllers subsequent access to the shared SIS device 140*a* without the need to seek permission from master controller 105*a*.

Still referring to FIG. 2, in some embodiments, each master controller 105*a*, 105*b*, 105*c*, and 105*d* may be granted different access levels to the shared SIS device 140*a* such that one or more of the master controllers may have more control and/or access to shared SIS device 140*a* than the others. For example, one access level may allow a master controller to have unrestricted access and control over the shared SIS device 140*a*, thereby allowing the master controller to add, retrieve, modify, delete, etc. sensitive information on the shared SIS device 140*a*, to back up the shared SIS device, and to share the sensitive information. Another access level may only allow a master controller to retrieve the sensitive information from the shared SIS device 140*a*. Access levels may also be used to restrict access to one or more accounts such that the master controllers can each only access and retrieve information from certain accounts on the shared SIS device 140*a*.

Still referring to FIG. 2, in one embodiment, if an account is updated on the shared SIS device 140*a*, the master controllers 105*a*, 105*b*, 105*c*, and 105*d* are not notified. However, if an account is added or deleted, the master controllers 105*a*, 105*b*, 105*c*, and 105*d* are notified of this change so that the master controllers can each update its list of accounts accordingly.

Still referring to FIG. 2, while the illustrated embodiment shows one SIS device being shared by four master controllers, it can be appreciated that the system 103 may have more or less than four master controllers sharing the SIS device 140*a*.

Figure 3:
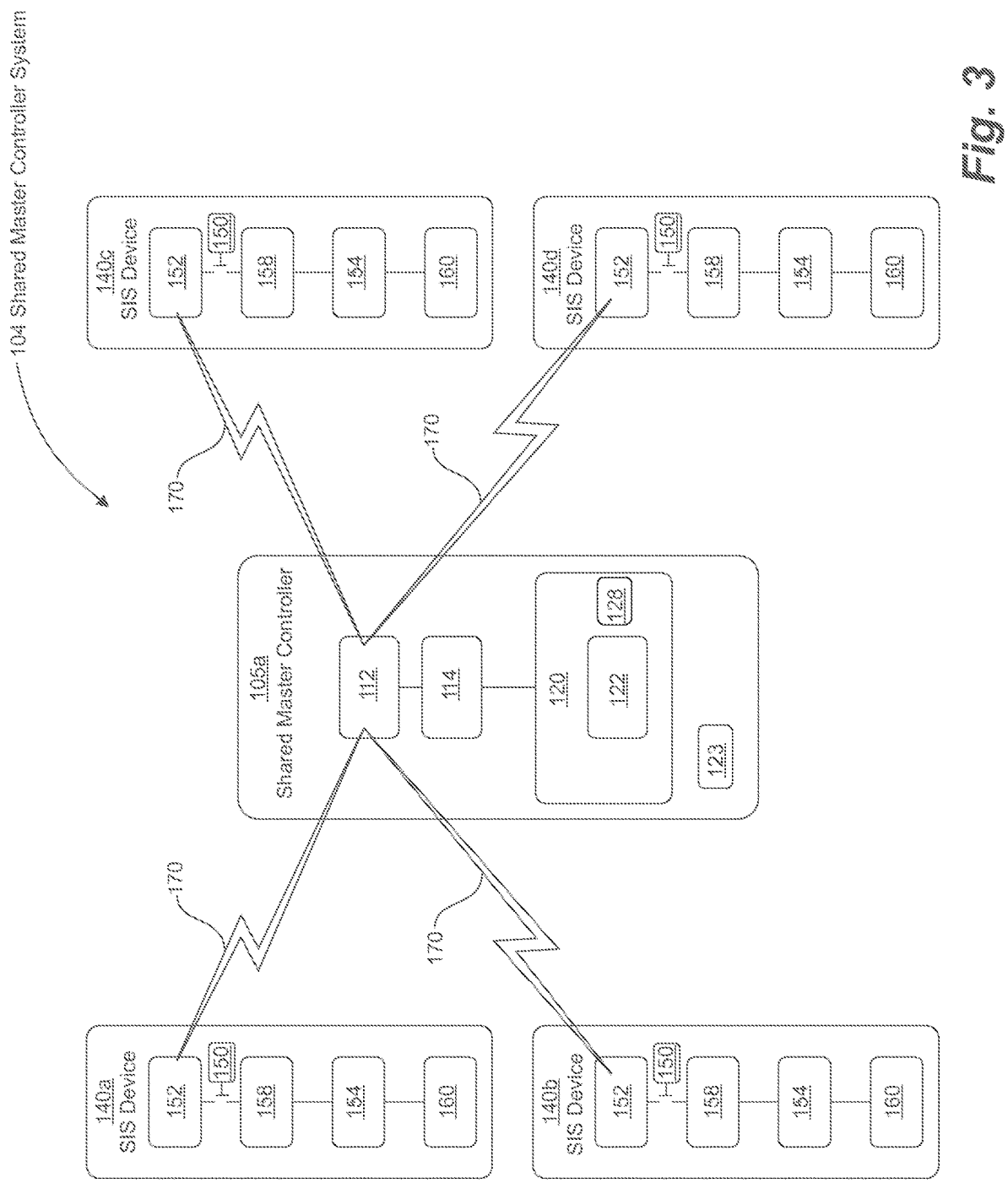
FIG. 3 is a block diagram illustrating a sample system comprising a shared master controller paired with multiple SIS devices, according to another embodiment of the present disclosure.

Referring to FIG. 3, in a sample system 104, a master controller 105*a* (the "shared master controller" hereafter) may be paired with multiple SIS devices 140*a*, 140*b*, 140*c*, 140*d*. For example, a user may have multiple SIS devices, each at a different location (e.g. work, home, worn on the body, etc.). The identification code of the shared master controller 105*a* is stored on each SIS device 140*a*, 140*b*, 140*c*, 140*d* and/or the passcode of the communication unit 152 of each SIS device 140*a*, 140*b*, 140*c*, 140*d* is provided to the shared master controller 105*a*, so that all the SIS devices 140*a*, 140*b*, 140*c*, 140*d* recognize the shared master controller 105*a* as an authorized master controller.

Still referring to FIG. 3, in some embodiments, each SIS device 140*a*, 140*b*, 140*c*, 140*d* may have different sensitive information stored thereon. For example, an SIS device that is carried around by the user may have less sensitive information stored thereon than an SIS device that is stored in a secured location at home since the chances of a portable SIS device being stolen and/or hacked are much greater. If an account is updated, added, or deleted by the user on one SIS device 140*a*, the shared master controller 105*a* will prompt the user to update the other SIS devices 140*b*, 140*c*, 140*d* by establishing communication link 170 and demonstrating user intent.

Still referring to FIG. 3, while the illustrated embodiment shows one master controller being shared by four SIS devices, it can be appreciated that the system 104 may have more or less than four SIS devices sharing the master controller 105a.

Referring back to FIG. 1, the following sample methods are described with respect to NFC enabled devices, unless specified otherwise. Similar methods may be implemented for devices that communicate using communication protocols other than NFC, with modifications that would be apparent to those skilled in the art.

Sample Method

Figure 4:
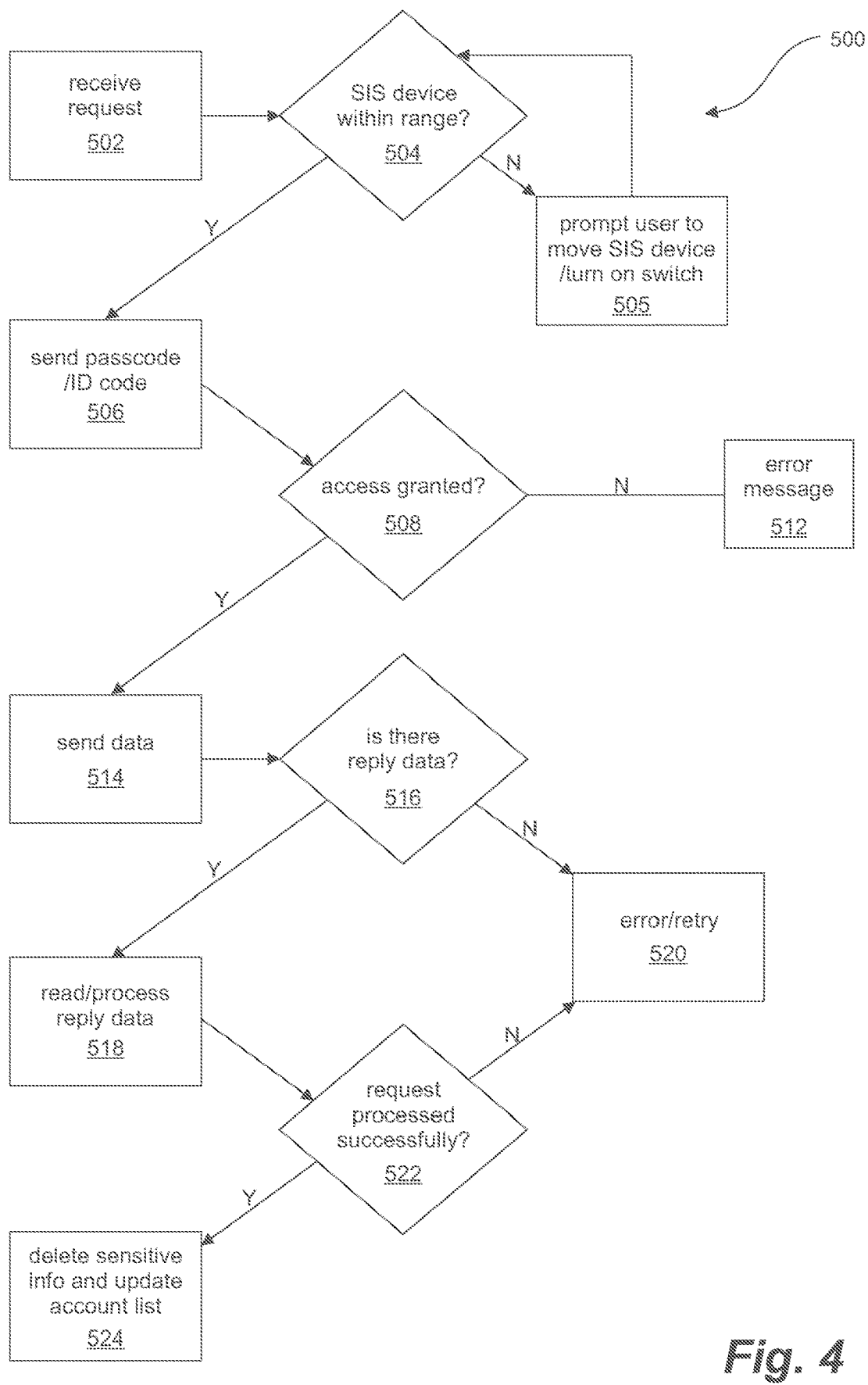
FIG. 4 is a flowchart illustrating an example method from the perspective of the master controller, according to an embodiment of the present disclosure.
Figure 5:
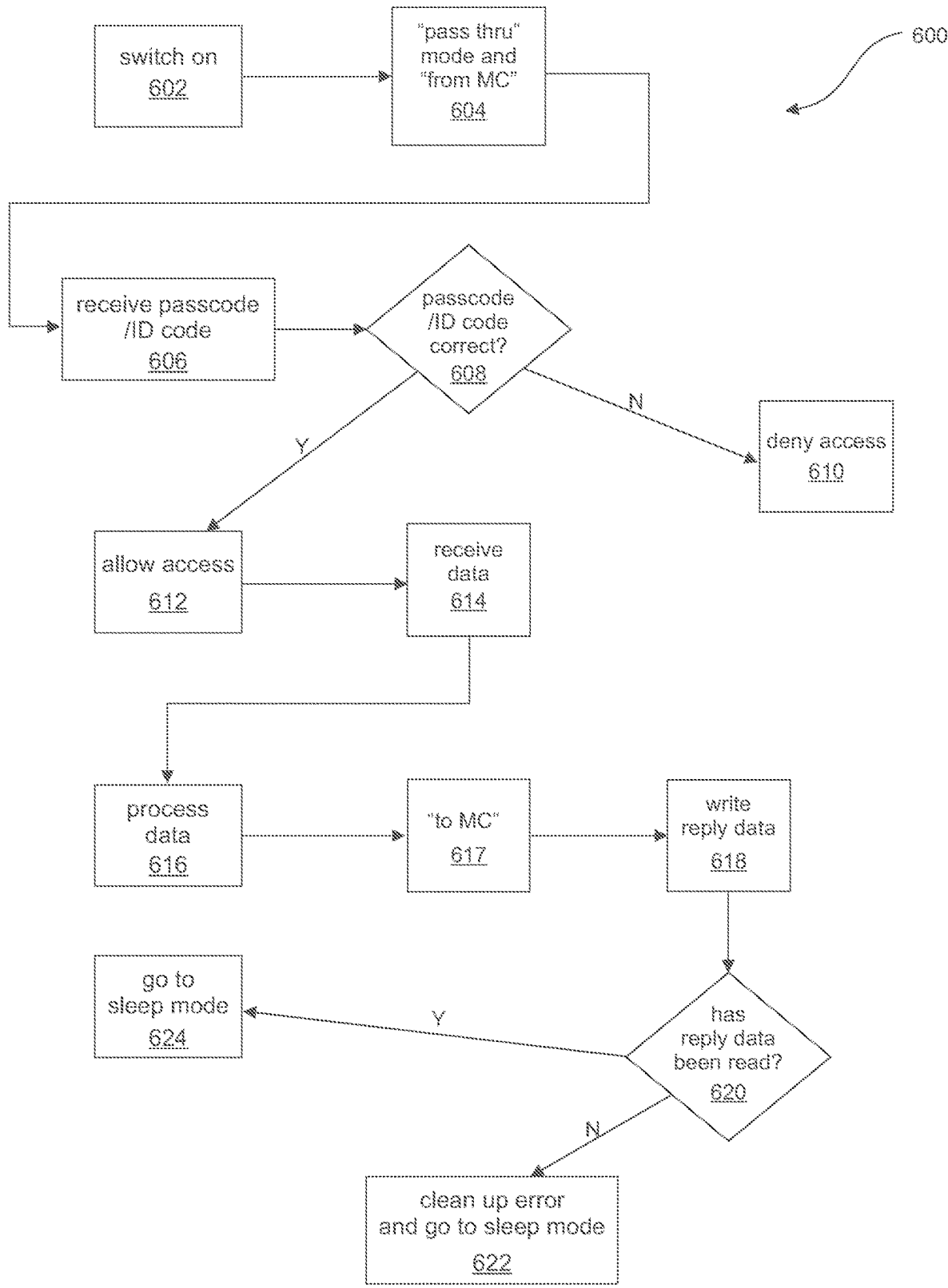
FIG. 5 is a flowchart illustrating an example method from the perspective of the SIS device, according to an embodiment of the present disclosure.

Referring to FIGS. 4 and 5, in processes 500 and 600, respectively, in one embodiment, a master controller has a software application 122 (also referred to as "app" hereinafter) installed thereon to manage and store sensitive information on a SIS device. The SIS device is offline unless the user shows intention to allow communication therewith and/or retrieval of information therefrom.

Still referring to FIGS. 4 and 5, when the user requests a task in the software application (step 502), the master controller searches for a SIS device within the range of the master controller's NFC signal. Even if the user's SIS device is within range, the master controller cannot detect it because the SIS device is offline by default (e.g. the switch is in the off position). In this embodiment, when the SIS device is in the default (off) position, the switch is off and the island is deactivated such that the SIS device's wireless communication unit 152 is disconnected from the communication controller 158. When the user turns the switch on (step 602), thereby activating the island, the SIS device's wireless communication unit is connected to the communication controller. Once the switch is turned on and the SIS device within range of the master controller, the SIS device is powered up by the NFC signal from the master controller and the microcontroller 154 sets the wireless communication unit 152 to "pass-thru" mode and sets the communication direction as "from MC" (as in "from master controller") (step 604), thereby enabling the SIS device's NFC function and rendering the SIS device detectable by the master controller (step 504). If the master controller cannot detect the SIS device, the app may prompt the user to move the SIS device within range and/or turn on switch 150 (step 505).

Still referring to FIGS. 4 and 5, with the SIS device powered up and the communication direction set as "from MC", the app authenticates the master controller by providing the communication controller 158 with an encryption key, passcode, and/or the identification code of the master controller (step 506 and step 606). If the encryption key, passcode, and/or identification code is incorrect (step 608), the communication controller 158 will send a signal to the master controller indicating that access is denied (step 610) and the app will display an error message (step 512). Otherwise, the communication controller 158 will allow the master controller access (step 612).

Still referring to FIGS. 4 and 5, once access is granted (step 508), the master controller sends data to the SIS device (step 514) and the data is written to the SRAM or volatile memory of the communication controller 158 (step 614). The memory of the communication controller 158 acts as a pass-through system to the rest of the SIS device. Any data written to the communication controller is lost when the SIS device has no power.

Still referring to FIGS. 4 and 5, the microcontroller 154 monitors the register flag of the communication controller 158 to see if the data is ready to be read from the communication controller. If the register flag indicates that data has been written to the communication controller, the microcontroller 154 proceeds to read the data. Once the data has been read by the microcontroller 154, the communication controller 158 sets the register flag to indicate that the data has been read. The app can check the register flag to determine whether the data written to the communication controller 158 has been read by the microcontroller 154.

Still referring to FIGS. 4 and 5, if the app needs to send more data to the SIS device, it can do so after the initial data has been read. The microcontroller 154 knows to wait before processing the data if the initial data indicates that more data is on its way to the communication controller 158. After the communication controller 158 receives all the expected data, the microcontroller 154 processes the data to determine the request being made by the app (step 616).

Still referring to FIGS. 4 and 5, the request made by the app may be one or more of (but not limited to) the following: Add user information; Retrieve user information; Modify user information; Delete user information; Update firmware; Retrieve all user information to be sent to a backup SIS device; Clean up memory storage; Disengage from master controller; Engage with new master controller; Retrieve contact information for engaging new master controller (when existing master controller is unable to disengage); and Check user information for passwords that are the same or similar to flag same to user; and Reset to factory settings and delete all user information.

Still referring to FIGS. 4 and 5, for example, if the user wants to add a new account to the SIS device, the user starts the app and the app will prompt the user to enter the information for the new account, including for example online source name, source website (if applicable), username, and password. For each new account, the master controller generates an Account ID. If there is more than one account for a particular online source, the master controller also generates an alias for each account. The master controller only stores the online source name, source website, and alias (if applicable) in association with each Account ID. In this case, the request generated by the app is for adding a new account and the data that is sent to the communication controller 158 (step 514) includes, the type of request, the Account ID, username, password, and optionally the online source name.

Still referring to FIGS. 4 and 5, at step 616, the microcontroller 154 processes the request for adding a new account by first scanning the memory 160 to determine if the Account ID already exists. If the same Account ID exists, the microcontroller 154 will overwrite the stored account information associated with the Account ID with the newly provided information because each Account ID is unique. If the Account ID does not exist in memory 160, the microcontroller 154 will store the new account information in the next available memory location in memory 160. Account information includes but is not limited to: Account ID, username, password, optionally the online source name, and placeholders for future flags and information. Once the new account information is stored, the microcontroller 154 updates the next available memory location. In one embodiment, the SIS device stores specific data that cannot be overwritten with account information and the data includes, for example, the next available memory location and placeholders for future flags and information, such as the device serial number, firmware version, memory size, etc.

Still referring to FIGS. 4 and 5 and referring back to FIG. 1, in another example, if the user wants to retrieve sensitive information from the SIS device, the user starts the app and the app will prompt the user to select an online source from a list of online sources. If there is more than one account associated with the selected online source, the app will also prompt the user to select an account from the online source. Once the user makes a selection, the master controller looks up the Account ID that is associated with the selected account. In this case, the request generated by the app is for retrieving sensitive information and the data that is sent to the communication controller 158 (step 514) includes the type of request and the Account ID that is associated with the selected account.

Still referring to FIGS. 4 and 5 and referring back to FIG. 1, at step 616, the microcontroller 154 processes the request for retrieving sensitive information by first scanning the memory 160 to find a match on the Account ID that was written to the communication controller 158. Once a match is found, the microcontroller reads the sensitive information associated with the Account ID stored in memory 160.

Still referring to FIGS. 4 and 5 and referring back to FIG. 1, in another example, if the user wants to delete sensitive information from the SIS device, the user starts the app and the app will prompt the user to select an online source from a list of online sources. If there is more than one account associated with the selected online source, the app will also prompt the user to select an account from the online source. Once the user makes a selection, the master controller looks up the Account ID that is associated with the selected account. In this case, the request generated by the app is for deleting sensitive information and the data that is sent to the communication controller 158 (step 514) includes the type of request and the Account ID that is associated with the selected account.

Still referring to FIGS. 4 and 5 and referring back to FIG. 1, at step 616, the microcontroller 154 processes the request for deleting sensitive information by first scanning the memory 160 to find a match on the Account ID that was written to the communication controller 158. Once a match is found, the microcontroller deletes all the account information that is associated with the Account ID from memory 160. The microcontroller 154 may update the next available memory location to the location previously occupied by the deleted account information.

Still referring to FIGS. 4 and 5 and referring back to FIG. 1, whichever type of request, once the data is processed the communication controller switches the communication direction to "to MC" (as in "to master controller") (step 617) and the microcontroller 154 then sends reply data to the communication controller 158. The register flag is then changed to indicate that the reply data has been written to the communication controller (step 618). The app monitors the register flag to determine when reply data has been written to the communication controller 158 (step 516). When the app sees the register flag indicating that reply data has been written, the app proceeds to read the reply data (step 518). If, after a prescribed time, the app cannot see any reply data, the app will display an error message and prompt the user to retry the request (step 520). In some embodiments, once the app has read the reply data, the communication controller 158 changes the register flag to indicate same to the microcontroller 154 and the microcontroller may write more reply data to the communication controller if necessary.

Still referring to FIGS. 4 and 5 and referring back to FIG. 1, the reply data may be a simple confirmation message as to whether the request has been fulfilled successfully, for example, where the request is for adding or deleting sensitive information. If the request is for retrieving information, the reply data will include the requested information. The reply data may also include information regarding the amount of data the master controller should expect so that the app may read multiple reply data writings before acting on the reply data. Once the app has received all the expected reply data, the app can follow through with the request. In some embodiments, the app may simultaneously act on the reply data while receiving the data.

Still referring to FIGS. 4 and 5 and referring back to FIG. 1, if the reply data indicates that the request has been fulfilled successfully (step 522), the app may notify the user of same and will delete any sensitive information that was inputted for the request from the memory of the master controller and update the list of accounts accordingly (step 524). For example, the master controller may update its internal database entries by storing or deleting the Account ID and the corresponding online source name and website (if applicable) and alias (if applicable) that are associated with the request. If the request is for retrieving sensitive information, the app may process the reply data by displaying the requested sensitive information (such as login credentials along with the corresponding online source name and website and alias (if applicable)) to the user via the output device 130, allowing the user to use the information (if applicable), and deleting the retrieved information from the memory of the master controller when the user is done. If the reply data indicates that the request has not been fulfilled successfully, the app will display an error message and prompt the user to retry the request (step 520).

Still referring to FIGS. 4 and 5 and referring back to FIG. 1, with respect to allowing the user to use the retrieved information, the master controller may provide the user various options including copying, sending, editing, and deleting the information, and closing the display window. Copying the information allows the user to subsequently paste the information into another app and/or program. Sending the information, for example via a connected communication protocol, allows the user to forward the information to another online communication device, which may include an online source. In one embodiment, the master controller sends the login credentials to the online communication device as keystrokes to log in automatically for the user. If there are multiple online communication devices paired via a communication protocol to the master controller, the master controller may provide a list of same to the user to allow the user to choose which online communication device to send the login credentials. Editing allows the user to modify the login credentials and then the app will send a request to the SIS device to update same. Closing the display window removes the login credentials from the master controller.

Still referring to FIGS. 4 and 5 and referring back to FIG. 1, once the app has read all the reply data, the communication controller 158 changes the register flag to indicate same. When the microcontroller sees the updated register flag (step 620), the microcontroller 154 goes into low power sleep mode in an infinite loop (step 624), thereby reverting the SIS device back to its default offline position. Since the microcontroller 154 goes in the low power sleep mode after each request is processed, the user needs to show user intent for each subsequent request, which may help prevent any malicious attempts to retrieve more information than what the user had intended. If the reply data has not been read by the app after a prescribed time (step 620), the microcontroller 154 will try to clean up any loose ends and revert the SIS device back to its default offline position (step 622) wherein the microcontroller 154 is in low power sleep mode in an infinite loop. The SIS device will also revert back to its default offline position if the switch 150 is turned off by the user and/or if there is no user interaction with the SIS device after a prescribed time. Once the SIS device is offline, any data written to the communication controller's SRAM or volatile memory is lost, while the data stored in the non-volatile memory 160 is maintained.

Logging in Using the Master Controller

Figure 6:
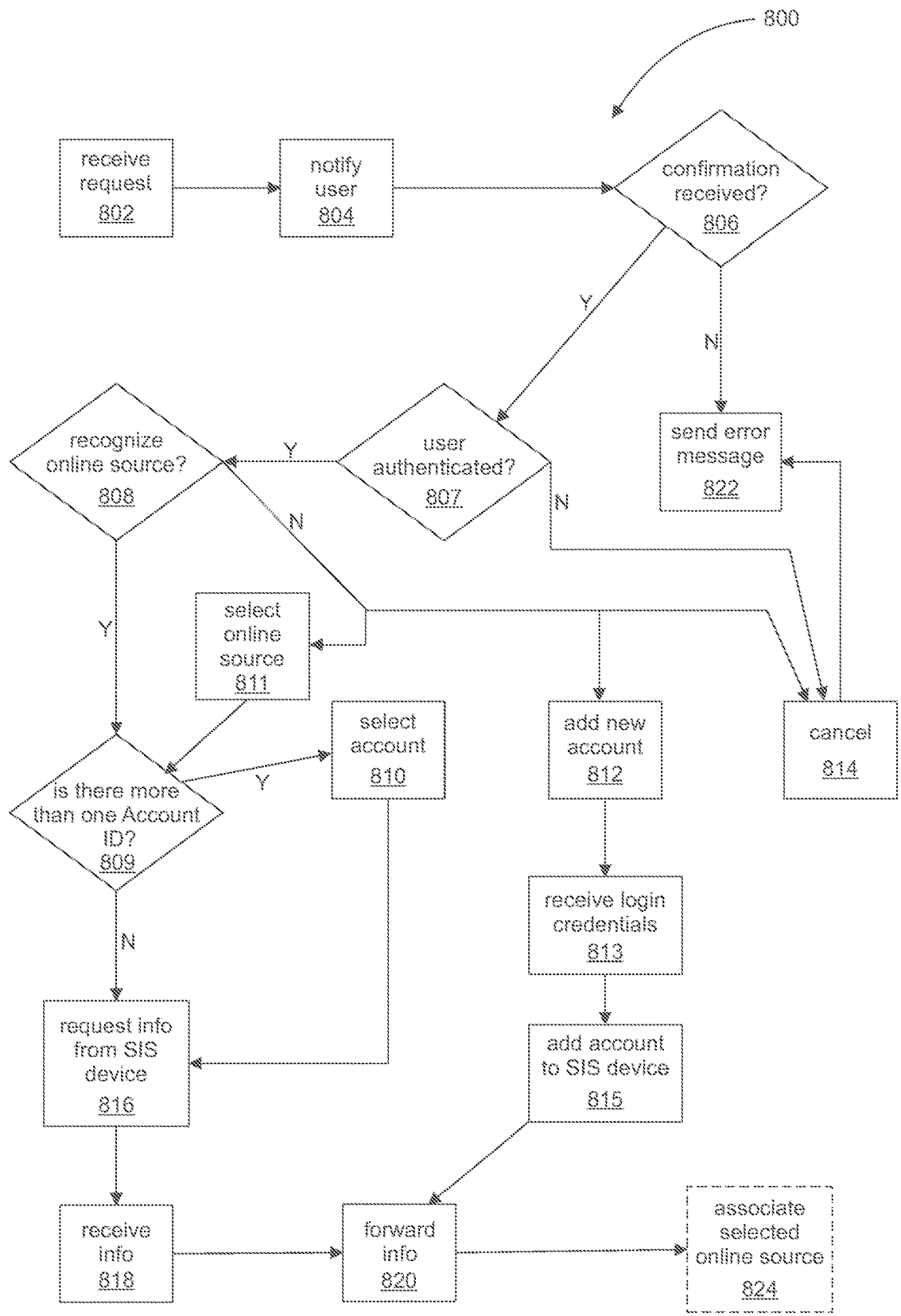
FIG. 6 is a flowchart illustrating another example method from the perspective of the master controller, according to an embodiment of the present disclosure.

Referring to FIG. 6, this flowchart shows a sample process 800 from the perspective of the master controller, which may be, for example, a smartphone with a fingerprint reader, according to an embodiment of the present disclosure. When the user tries to log into an online source via an online communication device, such as a personal computer, the communication device sends a login request along with the identity of the online source to the master controller (step 802). The online source may be, for example, a person computer or a website displayed on a personal computer. After receiving the login request, the master controller notifies the user, for example with a notification via output device 130, and requests confirmation from the user via input device 132 that the user is indeed trying to log into that specific online source (step 804). If the master controller does not receive the user's confirmation within a prescribed time (step 806), the master controller will send an error message to the communication device (step 822). Once the master controller receives confirmation from the user (step 806), the master controller requests the user to authenticate himself, for example via the fingerprint reader (step 807). If the user cannot be authenticated by master controller, then the request is cancelled (step 814).

Still referring to FIG. 6, if the user is successfully authenticated, the master controller determines if the online source requesting login is recognized by the master controller (step 808). If the online source is a recognizable one, then the master controller checks if there is more than one Account ID associated with the online source (step 809). If there is only one Account ID associated with the online source, the master controller requests the login credentials associated with the Account ID from the SIS device in accordance with process 500 as described above with respect to FIG. 4 (step 816). When the SIS device receives the request from the master controller, the SIS device proceeds in accordance with process 600 as describe described above with respect to FIG. 5. Once the master controller receives the requested login credentials from the SIS device (step 818), the master controller forwards same to the communication device to automatically log in to the online source (step 820).

Still referring to FIG. 6, if there is more than one Account ID associated with the online source (step 809), the master controller asks the user to select one of the accounts that are associated with the online source, for example, via the input and output devices 132, 130 (step 810). Once the user selects an account from the list of accounts associated with the online source, the master controller requests the login credentials associated with the Account ID of the selected account from the SIS device in accordance with process 500 as described above with respect to FIG. 4 (step 816). When the SIS device receives the request from the master controller, the SIS device proceeds in accordance with process 600 as describe above with respect to FIG. 5. Once the master controller receives the requested login credentials from the SIS device (step 818), the master controller forwards same to the communication device to automatically log in to the online source (step 820).

Still referring to FIG. 6, if the online source is not a recognizable one (step 808), the master controller provides the user with the following options: (i) select an online source from the list of online sources, for example via the input and output devices 132, 130 (step 811); (ii) create a new account (step 812); or (iii) cancel the request (step 814). If the user selects an online source from the list of online sources (step 811) and there is only one account associated with the selected online source (step 809), the master controller requests the login credentials associated with the Account ID of the selected online source from the SIS device in accordance with process 500 as described above with respect to FIG. 4 (step 816). If there is more than one Account ID associated with the selected online source (step 809), the master controller asks the user to select one of the accounts that are associated with the online source, for example via the input and output devices 132, 130 (step 810). Once the account is selected, the master controller requests the login credentials associated with the Account ID of the selected account from the SIS device in accordance with process 500 as described above with respect to FIG. 4 (step 816). When the SIS device receives the request from the master controller, the SIS device proceeds in accordance with process 600 as describe above with respect to FIG. 5. Once the master controller receives the requested login credentials from the SIS device (step 818), the master controller forwards same to the communication device to automatically log in to the online source (step 820). The master controller may optionally ask the user if the selected online source is to be associated with the online source from which the request was made for subsequent login requests from the same online source and then save the user's selection accordingly (step 824).

Still referring to FIG. 6, if the user chooses to create a new account (step 812), the master controller prompts the user to input the login credentials and other relevant information for the new account (813), and then sends a request to the SIS device to add the new account in accordance with process 500 as described above with respect to FIG. 4 (step 815). The master controller also saves the online source associated with the new account as a recognizable online source. When the SIS device receives the request from the master controller, the SIS device proceeds in accordance with process 600 as describe described above with respect to FIG. 5. The master controller also sends the login credentials provided by the user to the communication device to automatically log in to the online source (step 820). The master controller automatically associates the newly created account with the new online source for subsequent login requests.

Still referring to FIG. 6, if the user cancels the request, then the master controller will send a message to the communication device (step 822).

Referring back to FIGS. 1-6, in some embodiments, the memory 120, 160 or additional data storage in the master controller or SIS device are examples of computer-readable media (also referred to as "computer accessible media") for storing instructions that are executable by the microcontroller 154 or the control unit 114 to perform the various functions described above, including the methods described above and any variations thereof. Generally, any of the functions described with reference to the figures can be implemented using software, hardware (e.g., fixed logic circuitry) or a combination of these implementations. Program code may be stored in one or more computer-readable media or other computer-readable storage devices. Thus, the processes and components described herein may be implemented by a computer program product. As mentioned above, computer-readable media includes volatile and non-volatile, removable and non-removable media implemented in any method or technology for storage of information, such as computer readable instructions, data structures, program modules, or other data. The terms "computer-readable medium" and "computer-readable media" refer to transitory and non-transitory storage devices and include, but are not limited to, RAM, ROM, EEPROM, FRAM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a device, e.g., the master controller and SIS device. Any of such computer accessible media may be part of the master controller and/or SIS device.

Still referring to FIGS. 1-6, the operation of the SIS device does not require any involvement by or participation from service providers. Therefore, the systems and methods disclosed herein can be implemented without modifying existing networks or service provider infrastructure.

In the Detailed Description, numerous specific details are set forth in order to provide a thorough understanding of the present disclosure. However, those of ordinary skill in the art would appreciate that the present disclosure may be practiced without these specific details. In other instances, well-known methods, procedures, components and circuits have not been described in detail so as not to obscure the present disclosure.

For each method described in the present disclosure, the order in which the method blocks is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the present disclosure.

Accordingly, the present disclosure provides devices, systems, and methods for securely storing, managing, and/or retrieving data that may include sensitive information.

According to a broad aspect of the present disclosure, there is provided a device comprising: a communication unit operable to communicate with a master controller via a communication link; a memory; and an island activatable by user interaction, wherein activation or deactivation of the island controls the master controller's access to data stored in the memory via the communication link.

In one embodiment, the island is a non-software-based component of the device.

In one embodiment, the communication link is a direct connection and/or a wireless communication protocol.

In one embodiment, the communication link is NFC, Wi-Fi, Bluetooth, RFID, or a combination thereof In one embodiment, both the device and the master controller are NFC-enabled and the user interaction comprises the device being brought within NFC range of the master controller or vice versa.

In one embodiment, the device further comprises a switch having an on position and an off position, and the user interaction comprises the switch being placed in the on position; when the switch is in the on position, the island is activated; and when the switch is in the off position, the island is deactivated.

In one embodiment, the communication unit comprises an antenna, and when the switch is off, the antenna is disconnected and when the switch is on, the antenna is connected.

In one embodiment, the user interaction comprises user biometric input.

In one embodiment, when the island is activated, the data is accessible by the master controller via the communication link, and the access comprises one or more of modification of the data; retrieval of the data; addition to the data; and deletion of some or all of the data.

In one embodiment, when the island is activated, the island is in communication with the memory but not with the communication unit; and when the island is deactivated, the island is in communication with the communication unit but not with the memory.

In one embodiment, the communication unit is operable to receive a request from the master controller via the communication link and/or the master controller is operable to receive the data from the communication unit.

In one embodiment, when the island is activated, the island is operable to receive the data from the memory; and when the island is deactivated, the communication unit is operable to read from and/or write to the island.

In one embodiment, the island is automatically deactivated in the absence of the user interaction.

In one embodiment, the data comprises sensitive information. In a further embodiment, the sensitive information comprises one or more of login credentials, SIN number, SSN number, healthcare number, bank account number, lock combination, passport number, cryptocurrency, tokens, certificates, and a digital file.

In one embodiment, the data comprises: one or more accounts or account IDs; and login credentials corresponding the one or more accounts or account IDs.

In one embodiment, the data comprises one or more memory locations.

In one embodiment, the device further comprises a range indicator.

In one embodiment, the device is sized to be portable or to be embeddable in a portable object.

In one embodiment, the island is a pass-through system.

In one embodiment, the device is powered by the communication link and the device is free of an internal power supply.

According to another broad aspect of the present disclosure, there is provided a system comprising: a master controller; an SIS device operable to communicate with the master controller via a communication link, the SIS device comprising: a memory; and an island activatable by user interaction, wherein activation or deactivation of the island controls the master controller's access to data stored in the memory via the communication link.

In one embodiment, the island is a non-software-based component of the SIS device.

In one embodiment, the communication link is a direct connection.

In one embodiment, both the SIS device and the master controller are NFC-enabled and the user interaction comprises the SIS device being brought within NFC range of the master controller or vice versa.

In one embodiment, the SIS device comprises a switch having an on position and an off position;
the user interaction comprises the switch being placed in the on position; and when the switch is in the on position, the island is activated and when the switch is in the off position, the island is deactivated.

In one embodiment, the user interaction comprises user biometric input and the master controller is configured to receive the user biometric input.

In one embodiment, when the island is activated, the data is accessible by the master controller via the communication link; and the access comprises one or more of modification of the data; retrieval of the data; addition to the data; and deletion of some or all of the data.

In one embodiment, when the island is activated, the island is in communication with the memory but not with the communication unit; and when the island is deactivated, the island is in communication with the communication unit but not with the memory.

In one embodiment, the island is automatically deactivated in the absence of the user interaction.

In one embodiment, the master controller contains a particular encryption key, a particular identification code, and/or a particular passcode; and the SIS device is configured to only communicate with the master controller having the particular encryption key, the particular identification code, and/or the particular passcode.

In one embodiment, the SIS device has an identification number; and the master controller is configured to only communicate with the SIS device having the identification number.

In one embodiment, the system further comprises a backup SIS device having stored thereon the particular encryption key, the particular identification code, and/or the particular passcode.

In one embodiment, the system further comprises a new master controller operable to obtain the particular encryption key, the particular identification code, and/or the particular passcode from the backup SIS device.

In one embodiment, the backup SIS device has backup data stored thereon and the SIS device is operable to compare the data with the backup data.

In one embodiment, the backup SIS device has a different program structure than the SIS device.

In one embodiment, the SIS device has one or more recovery contacts stored thereon and the system further comprises a new master controller associated with one of the one or more recovery contacts.

In one embodiment, the master controller is operable to export the data in an export file.

In one embodiment, the master controller and the SIS device are components of an integrated SIS device.

In one embodiment, the user interaction comprises user biometric input and the integrated SIS device is configured to receive the user biometric input.

In one embodiment, the system further comprises a second master controller, and the SIS device is connectable to the second master controller via a second communication link, and activation or deactivation of the island controls the second master controller's access to the data via the second communication link.

In one embodiment, the second master controller is configured to send and/or receive shared data from the master controller.

In one embodiment, the master controller and/or the second master controller are configured to set a restriction on the shared data; and the restriction prohibits one or more of: sharing the shared data more than once; storing the shared data in a second SIS device associated with the second master controller; and retrieving the shared data from the second SIS device without the master controller receiving a notification from the second master controller and/or the second master controller receiving a confirmation from the master controller.

In one embodiment, the master controller is configured to monitor the second master controller's use of the shared data.

In one embodiment, the second master controller is configured to notify the master controller of any change to or deletion of the shared data.

In one embodiment, the system further comprises a backup SIS device associated with the second master controller.

In one embodiment, a restriction is set on the second master controller's access to the data, and the restriction prohibits one or more of: modification of the data; retrieval of the data; addition to the data; deletion of the data; backing up of the data on a backup SIS device; sharing of the data; and access to some of the data.

In one embodiment, the system further comprises a second SIS device connectable to the master controller via a second communication link, the second SIS device comprising: a second memory; and a second island activatable only by a second user interaction, and activation or deactivation of the second island controls the master controller's access to a second data stored in the second memory via the second communication link.

According to another broad aspect of the present disclosure, there is provided a method of storing and managing sensitive information, the method comprising: upon detecting user interaction from a user, activating an island in an SIS device, the SIS device configured to communicate with a master controller via a communication link; and controlling access, by the master controller via the communication link, to data stored on the SIS device, based on the activation or deactivation of the island.

In one embodiment, the island is a non-software-based component of the SIS device.

In one embodiment, both the SIS device and the master controller are NFC-enabled and the user interaction comprises bringing the SIS device within NFC range of the master controller or vice versa.

In one embodiment, the SIS device comprises a switch having an on position and an off position; the user interaction comprises placing the switch in the on position; and when the switch is in the on position, the island is activated and when the switch is in the off position, the island is deactivated.

In one embodiment, controlling access comprises, when the island is activated, allowing access by the master controller to the data via the communication link, and the access comprises one or more of: modification of the data; retrieval of the data; addition to the data; and deletion of some or all of the data.

In one embodiment, controlling access comprises when the island is activated, allowing access to the data by the island while restricting communication between the island and the master controller; and upon deactivation of the island, restricting access to the data by the island while allowing communication between the island and the master controller, and the access comprises one or more of: modification of the data; retrieval of the data; addition to the data; and deletion of some or all of the data.

In one embodiment, the method further comprises deactivating the island in the absence of the user interaction.

In one embodiment, when the island is deactivated, the island is free of any of the data.

In one embodiment, the method further comprises authenticating the master controller or a new master controller; and/or authenticating the SIS device or a new SIS device.

In one embodiment, the SIS device has a recovery contact stored thereon, and authenticating the new master controller comprises sending a message containing a passcode to the recovery contact.

In one embodiment, the method further comprises retrieving, by the new master controller, an encryption key, an identification code, and/or a passcode from a backup SIS device.

In one embodiment, the method further comprises retrieving, by the new master controller, backup data stored on the backup SIS device; and transmitting the backup data to the SIS device.

In one embodiment, the method further comprises overwriting the data in the SIS device with the backup data.

In one embodiment, the method further comprises comparing, by the SIS device or by the master controller, the backup data with the data.

In one embodiment, the method further comprises replacing the SIS device with the backup SIS device.

In one embodiment, the method further comprises, prior to activating the island, either: (i) generating a request by the master controller; or (ii) receiving the request from an online source and providing notification of the request on the master controller.

In one embodiment, the method further comprises requesting confirmation from the user; and upon receiving the confirmation, authenticating the user.

In one embodiment, the request is associated with sensitive information and the request is for one of: addition of the sensitive information to the data; modification of the sensitive information, if the sensitive information is part of the data; retrieval of the sensitive information, if the sensitive information is part of the data; and deletion of some or all of the sensitive information, if the sensitive information is part of the data, and the access comprises one or more of modification of the data; retrieval of the data; addition to the data; and deletion of some or all of the data, and the method further comprises transmitting the request to the SIS device.

In one embodiment, the request is for the retrieval of the sensitive information, further comprising retrieving by the master controller the sensitive information associated with the request from the SIS device, upon detection of the user interaction.

In one embodiment, the method further comprises transmitting the sensitive information to the online source.

In one embodiment, the method further comprises, prior to or after transmitting the sensitive information, converting the sensitive information into keystrokes to allow automatic login at the online source.

In one embodiment, the method further comprises deactivating the island and/or providing notification upon completion of the request or failure to carry out the request.

In one embodiment, the method further comprises one or more of copying, sending, editing, and deleting the retrieved sensitive information.

In one embodiment, the method further comprises: determining whether the online source is recognizable; if the online source is recognizable, determining a number of accounts associated with the online source; and if the number of accounts is more than one, providing a list of accounts and receiving a selection from the list of accounts.

In one embodiment, the method further comprises: determining whether the online source is recognizable; if the online source is not recognizable, one of: providing a list of online sources and/or a list of accounts and receiving a selection from the list of online sources and/or the list of accounts; requesting information to create a new account and adding the new account to the SIS device; and cancelling the request.

In one embodiment, the method further comprises associating the selection or the new account with the online source.

In one embodiment, the method further comprises looking up an account ID or a memory location associated with the online source or the selection; and transmitting the account ID or the memory location along with the request.

In one embodiment, the SIS device is configured to communicate with a second master controller via a second communication link, and further comprising controlling access, by the second master controller via the second communication link, to data stored on the SIS device, based on the activation or deactivation of the island.

In one embodiment, the method further comprises setting a restriction on the second master controller's access to the data, and the restriction prohibits one or more of: modification of the data; retrieval of the data; addition to the data; deletion of some or all of the data; backing up of the data on a backup SIS device; sharing the data; and access to some of the data.

In one embodiment, the method further comprises adding to the data or deleting some or all of the data; and notifying the master controller and the second master controller of same.

In one embodiment, the method further comprises, upon detecting a second user interaction on a second SIS device, activating a second island in the second SIS device having a second data stored thereon, the second SIS device configured to communicate with the master controller via a second communication link; and controlling access to the second data by the master controller via the second communication link based on the activation or deactivation of the second island.

In one embodiment, the method further comprises modifying, adding to, or deleting at least some of the data; and prompting a user to correspondingly modify, add to, or delete at least some of the second data on the second SIS device.

The previous description of the disclosed embodiments is provided to enable any person skilled in the art to make or use the embodiments of the present disclosure. Various modifications to those embodiments will be readily apparent to those skilled in the art, and the generic principles defined herein may be applied to other embodiments without departing from the spirit or scope of the subject matter of the present disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:
1. A system comprising:
 a master controller;
 a sensitive information storage (SIS) device comprising:
  a communication unit, comprising at least one of hardware, firmware, and software, for establishing external communication in relation to the device, the communication unit operable with a master controller via a communication link;

a memory; and an island configured to be activated by a user interaction, the island hardware having an island control;

wherein one of activating and deactivating of the island control respectively permits and denies access by the master controller to data stored in the memory via the communication link;

wherein the island is in communication with the memory, but not with the communication unit, when the island is activated;

wherein the island is in communication with the communication unit, but not with the memory, when the island is deactivated;

wherein the island is automatically deactivated in an absence of a user interaction.

2. The system of claim 1 wherein the user interaction comprises a user biometric input and wherein at least one of the master controller and the SIS device is configured to receive the user biometric input.

3. The system of claim 2 wherein the SIS device further comprises a switch having an on position and an off position; wherein the user interaction comprises the switch being placed in the on position when the island is activated; and the switch is in the off position when the island is deactivated.

4. The system of claim 1 wherein the SIS device memory is a secure element hardware chip having stored thereon at least one of: a cryptocurrency, a cryptography private key, a symmetric encryption key, a token, a certificate, a login credential, and a digital file.

5. The system of claim 1 wherein the SIS device further comprises a microcontroller, wherein the microcontroller comprises a program to interpret the data sent to the island from the master controller, wherein when the island is activated, the program to interpret the data further comprises one or more of: modification of the data; retrieval of the data; addition to the data; and deletion of some or all of the data.

6. The system of claim 5 wherein the modification and/or retrieval of data comprises of at least one of: signing a cryptography transaction and returning the result; generating cryptography public-private key pair and returning public key; and encrypted and/or decrypting data with symmetric encryption key and returning result.

7. The system of claim 6 wherein the signing of a cryptography transaction comprises of at least one of: one or more cryptography public key; one or more cryptography private key; one or more symmetric cryptography key; one or more hardware number; one or more software number; one or more firmware number; and one or more biometric key.

8. The system of claim 1 wherein the SIS device has an identification number; and wherein the master controller is configured to only communicate with the SIS device having the identification number.

9. The system of claim 1 wherein the master controller contains a particular encryption key, a particular identification code, and/or a particular passcode; and wherein the SIS device is configured to only communicate with the master controller having the particular encryption key, the particular identification code, and/or the particular passcode.

10. The system of claim 1 wherein the master controller and the SIS device are components of an integrated SIS device.

11. The system of claim 9 further comprising one or more backup SIS device having stored thereon the particular encryption key, the particular identification code, the particular passcode, one or more cryptocurrency seed, and/or the backup data of the SIS device.

12. The system of claim 11 wherein the backup SIS device comprises a different program and/or data structure than the SIS device.

13. The system of claim 9 further comprising a new master controller operable to obtain the particular encryption key, the particular identification code, the particular passcode, and/or one or more cryptocurrency seed from the backup SIS device.

14. The system of claim 1 further comprising a second or more master controller, wherein the SIS device is connectable to the second or more master controller.

15. The system of claim 14 wherein the second or more master controller is configured to send and/or receive shared data from the master controller.

16. The system of claim 15 wherein the master controller and/or the second or more master controller are configured to set a restriction on the shared data; and wherein the restriction prohibits one or more of: sharing the shared data more than once; storing the shared data in a second or more SIS device associated with the second or more master controller; and retrieving the shared data from the second or more SIS device without the master controller receiving a notification from the second or more master controller and/or the second or more master controller receiving a confirmation from the master controller.

17. The system of claim 15 wherein the master controller is configured to monitor the second or more master controller's use of the shared data.

* * * * *